United States Patent [19]

Fraysse et al.

[11] Patent Number: 5,520,721
[45] Date of Patent: May 28, 1996

[54] ADSORPTION PROCESS AND UNIT FOR THE PRODUCTION OF A GAS BY SEPARATION OF A GASEOUS MIXTURE

[75] Inventors: Sylvie Fraysse, Fontenay Aux Roses; Christine Marot; Pierre Petit, both of Buc; Jean-Marc Scudier, Chatel-Guyon, all of France

[73] Assignee: L'Air Liquide, Societe Anonyme pour l'Etude et l'Exploitation des Procedes Georges Claude, Paris Cedex, France

[21] Appl. No.: 302,650

[22] PCT Filed: Jan. 4, 1994

[86] PCT No.: PCT/FR94/00012

§ 371 Date: Nov. 8, 1994

§ 102(e) Date: Nov. 8, 1994

[87] PCT Pub. No.: WO94/15699

PCT Pub. Date: Jul. 21, 1994

[30] Foreign Application Priority Data

Jan. 8, 1993 [FR] France ................................. 93 00140

[51] Int. Cl.$^6$ .................................................. B01D 53/047
[52] U.S. Cl. ................................. 95/114; 95/117; 95/130; 96/126; 96/132
[58] Field of Search ..................... 95/96–106, 114, 95/115, 117, 121, 130; 96/121, 126–128, 130–132

[56] References Cited

U.S. PATENT DOCUMENTS

| 2,083,732 | 6/1937 | Moore et al. | 96/126 |
| 2,661,808 | 12/1953 | Kahle | 95/115 |
| 2,675,089 | 4/1954 | Kahle | 96/126 X |
| 3,140,931 | 7/1964 | McRobbie | 95/117 X |
| 3,150,942 | 9/1964 | Vasan | 95/115 |
| 3,221,477 | 12/1965 | Arnoldi et al. | 95/105 X |
| 3,734,293 | 5/1973 | Biskis | 96/126 X |
| 3,866,428 | 2/1975 | Simonet et al. | 95/121 X |
| 3,973,931 | 8/1976 | Collins | 95/99 |
| 4,026,680 | 5/1977 | Collins | 96/126 X |
| 4,329,158 | 5/1982 | Sircar | 95/99 X |
| 4,541,851 | 9/1985 | Bosquain et al. | 96/126 |
| 4,698,072 | 10/1987 | Rohde et al. | 96/131 X |
| 4,881,958 | 11/1989 | Eckardt et al. | 96/127 |
| 5,169,413 | 12/1992 | Leavitt | 95/96 |
| 5,232,479 | 8/1993 | Poteau et al. | 96/131 |
| 5,268,022 | 12/1993 | Garrett et al. | 96/126 X |

FOREIGN PATENT DOCUMENTS

| 0042159 | 12/1981 | European Pat. Off. . |
| 0118349 | 9/1984 | European Pat. Off. . |
| 0202516 | 11/1986 | European Pat. Off. . |
| 0504524 | 9/1992 | European Pat. Off. . |

*Primary Examiner*—Robert Spitzer
*Attorney, Agent, or Firm*—Young & Thompson

[57] ABSTRACT

In a pressure-swing adsorption-type gas separation unit, a distinct intermediate gas passageway is formed between a first water retaining bed (A) and a second separating adsorbent bed (B), a controlled heat flow being supplied to prevent the formation of a very cold area between both beds. The unit is particularly useful in the production of oxygen from air.

13 Claims, 3 Drawing Sheets

5,520,721

ADSORPTION PROCESS AND UNIT FOR THE PRODUCTION OF A GAS BY SEPARATION OF A GASEOUS MIXTURE

FIELD OF THE INVENTION

The present invention relates to processes for the production of a gas by separation by adsorption of a gaseous mixture containing this gas in at least one adsorption unit comprising, associated in series, a first adsorbent bed for the retention of water and a second adsorbent bed for separation, comprising a gas production step in which the gaseous mixture passes successively through the first and second beds.

BACKGROUND OF THE INVENTION

It is known that in the processes of this type, so-called "PSA" (Pressure Swing Adsorption), there is progressively formed, in operation, a temperature gradient in the separation adsorbent bed, which results particularly, at the end of about ten hours of operation, in the creation of a particularly cold zone in the upstream portion of the separation bed, which greatly affects the production output during cyclic operation under vacuum or pressure, and this the more so as the operating pressure is higher (greater than $5 \times 10^5$ Pa). To overcome this drawback, it has been proposed to heat the gaseous mixture to be separated, as described in U.S. Pat. No. 3,973,931 or to immerse in the upstream portion of the adsorbent bed a heat source, as described in the above-mentioned patent, or, more recently, in EP-A-502.627 which describes also an adsorbent unit of the type defined in the first paragraph. The heating of the gaseous mixture gives satisfactory results for very small installations but becomes inoperative, and moreover prohibitive, for installations with industrial capacity (greater than 0.5 ton of production gas per day). The inclusion in the adsorbent bed of effective heating means considerably increases the cost of production.

SUMMARY OF THE INVENTION

The present invention has for its object to provide a process permitting in a simple and effective manner, involving only a small increase in the cost of production and low operating costs, substantially avoiding the formation of a cold zone, particularly in the processes of separation for the production of oxygen under a pressure greater than $7 \times 10^5$ Pa.

To do this, according to one characteristic of the invention, the process comprises the steps of providing a portion of the intermediate gas passage, typically of a short length, establishing communication between the first and second beds and applying to this intermediate passage portion a heat flow, preferably controlled and of reduced intensity, to raise its temperature, typically to a level not less than −20° C., preferably not less than 0° C.

According to other characteristics of the invention:
  the portion of the intermediate passage is disposed permanently in heat exchange relation with a source of heat, for example a gas and/or a thermal generator;
  the gaseous mixture is air supplied to the adsorption unit at a pressure greater than $7 \times 10^5$ Pa, for the production of oxygen under pressure.

The present invention also has for its object providing an adsorption unit for practicing the above process, of the type comprising, in series in a production circuit of the gas to be separated, a gaseous mixture inlet, first and second adsorbent beds and a production gas outlet, characterized in that it comprises an intermediate circuit portion connecting at least one downstream portion of the first bed to at least one upstream portion of the second bed and associated with means for supplying a heat flux, at least to the gas passing therethrough, in at least one direction, in the intermediate circuit portion.

According to more particular characteristics of the invention:
  the intermediate passage portion is in heat exchange relation with a heat source, for example a gas or a thermal generator;
  the first and second beds are disposed respectively in first and second superposed enclosures, for example annular, the intermediate circuit portion being, in this latter case, also annular.

BRIEF DESCRIPTION OF THE DRAWINGS

Other characteristics and advantages of the present invention will become apparent from the following description of embodiments, given by way of illustration but in no way limiting, with respect to the accompanying drawings, in which.

DETAILED DESCRIPTION OF THE INVENTION

Figure 1:
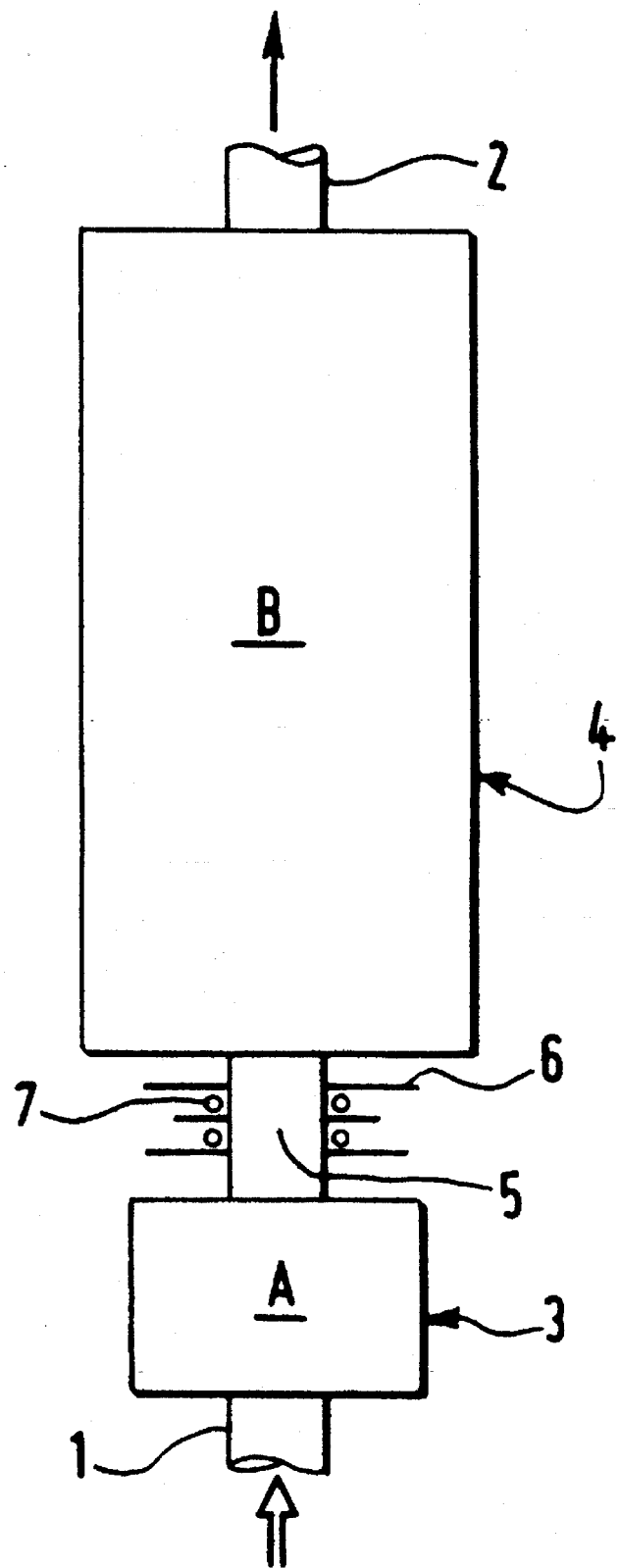
FIG. 1 is a schematic view of an adsorption unit for the production of a gas under high pressure according to the invention.

In the description which follows and in the drawings, identical or analogous elements bear the same reference numerals, indexed as the case may be.

There is shown in FIG. 1 an adsorption unit of an installation for the production of high pressure oxygen of the PSA type, comprising typically at least two such adsorption units arranged sequentially, as is known in the art. Each adsorption unit comprises in series, referring to one phase of oxygen production, an inlet 1 for air under pressure, a first adsorbent bed A containing a material adapted to retain water and carbon dioxide in the air, typically alumina, associated with a second adsorbent bed B, adapted to retain nitrogen from the air and letting pass the oxygen, typically a zeolite 5A, and an oxygen production outlet 2.

According to one aspect of the invention, the adsorbent beds A and B are physically separated by being disposed in respective separate enclosures 3 and 4 interconnected by an intermediate circuit portion 5 of reduced diameter, typically substantially less than that of the enclosures 3 and 4 and of short length. The region of formation of the cold point between the downstream region of the first bed A and the upstream region of the second bed B is thus precisely located and, by heat exchange between the intermediate circuit portion 5 and the surrounding atmosphere, preferably promoted by fins 6, the temperature of the formation region of the cold point is raised several tens of degrees C. For the production of oxygen with an air supply pressure of about $10 \times 10^5$ Pa, with beds A and B adjacent in a same enclosure, the purity of the production oxygen will not exceed 85% because of the formation of a cold point at a temperature below −70° C.; with the adsorption unit according to FIG. 1, the temperature of the cold point is brought to about 0° C., and the purity of the production oxygen exceeds 90% with productivity of the order of 10 Nm³/hour/m³. According to the ambient temperature, the temperature of the "cold" zone can be controlled and regulated within a selected range (typically between 0 and 20° C.) by heating resistances 7 disposed about the intermediate circuit portion 5, the assembly of the adsorption unit then being preferably insulated.

Figure 2:
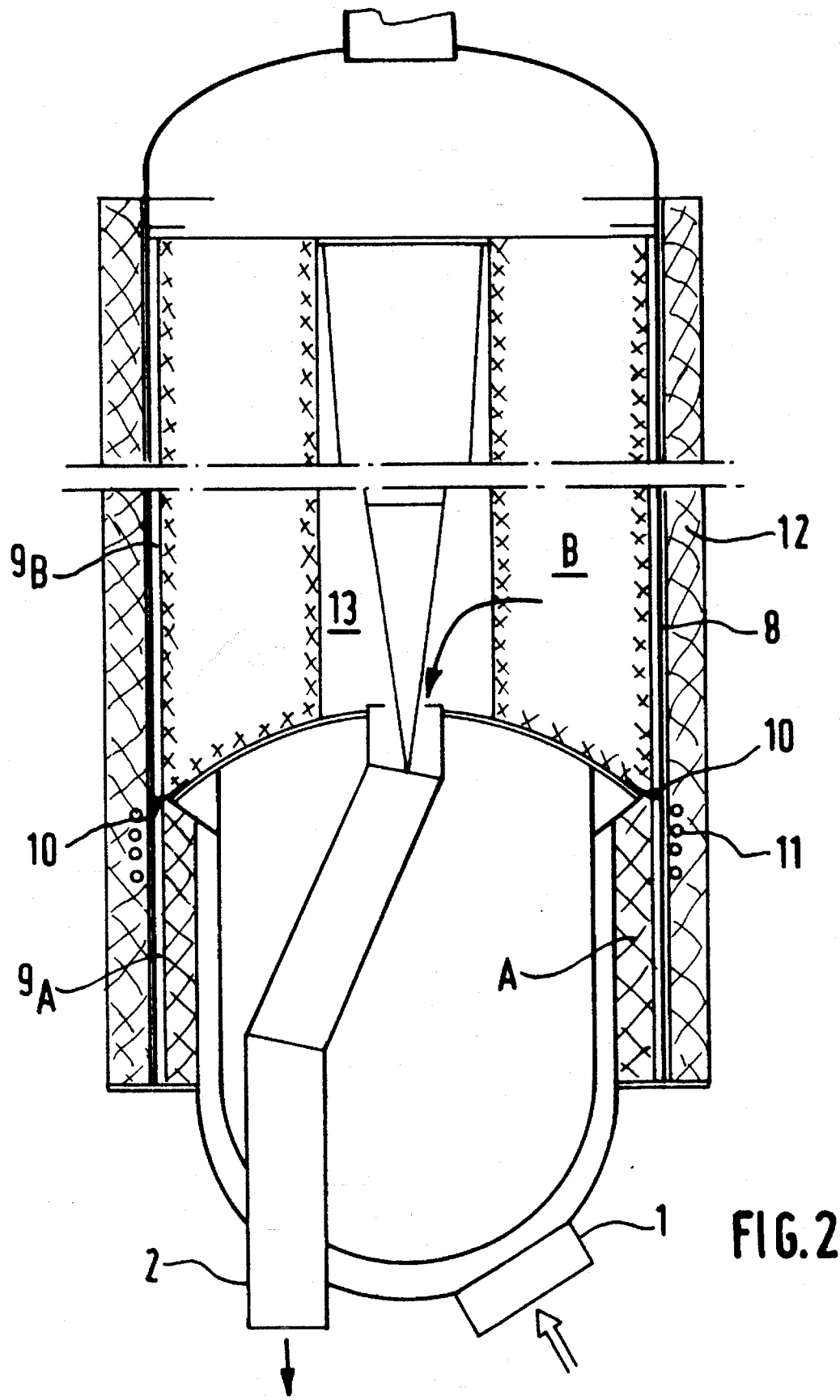
FIG. 2 is a schematic cross sectional view of an adsorption unit with high productivity at low pressure according to the invention.

There is shown in FIG. 2 an oxygen production unit with high productivity operating in a so-called "vacuum" cycle (high pressure of the cycle, between 0.9 and $1.5 \times 10^5$ Pa, and low pressure of the cycle substantially less than atmospheric pressure) and with superposed annular adsorbent beds, as described in French patent application No. 91.09718 of Jul. 31, 1991, in the name of the applicant. In this embodiment, each bed is confined in an enclosure with concentric perforated tubular walls and they are disposed, one above the other, in a peripheral sleeve 8 providing, about the beds A and B, an annular gas passage 9A, 9B. The air supplied under pressure introduced in the inlet passageway 1 flows through the lower bed A of alumina radially toward the exterior until it reaches the lower passage 9A from which it passes into the upper passage portion 9B to flow radially toward the interior of the upper bed B of zeolite, the oxygen passing centrally towards a central region 13 then into the outlet channel 2. According to the invention, in the region of connection between the passage portions 9A and 9B, where there is a physical separation, by a partition, between the upper end of the alumina bed A and the lower end of the zeolite bed B, is disposed an annular heating resistance 10 to avoid the formation of a very cold point at this interface region. Preferably, a heating coil 11, electrical or for the circulation of a hot fluid, is disposed about the downstream region of the intermediate passage 9A to heat the sleeve 8, forming a radiator, and also to avoid the cooling of the upper portion of the alumina bed A. According to a more particular characteristic of the invention, as mentioned above, the entirety of the intermediate passages 9A and 9B and hence the beds A and B, is surrounded by an annular envelope of insulating material 12, for example polystyrene foam loaded with glass fiber, arranged on the external surface of the sleeve 8.

Figure 3:
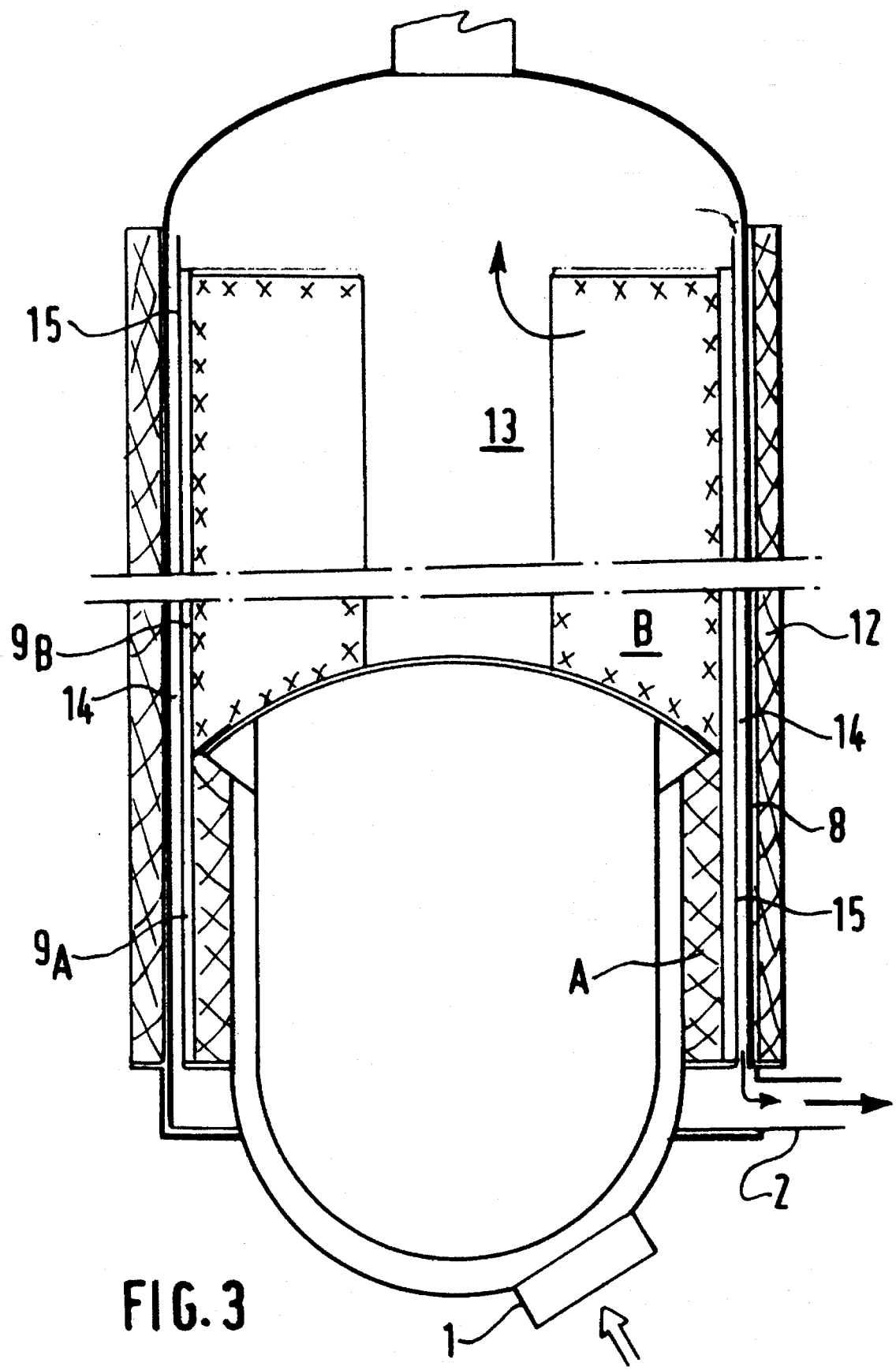
FIG. 3 is a view of a modified embodiment of the adsorption unit of FIG. 2.

The embodiment of FIG. 3 is different from that of FIG. 2 and of the French application mentioned above, in the sense that the downward outlet for oxygen is in this case not central but peripheral, the central region 13, within the bed B, communicating upwardly with an annular passage 14 opening downwardly into the oxygen outlet 2 and extending axially between the sleeve 8 carrying the insulation 12 and an intermediate sleeve 15 delimiting externally the portions of the passage 9A, 9B. In this way, all of the passage portions 9A, 9B are maintained substantially at the temperature of the production oxygen leaving the upper bed B, which, by way of the sleeve 15, is moreover lowered. If desired, additional resistances such as 10 and 11 can be kept, as described with respect to FIG. 2. As a modification, only one annular portion of the production gas circuit can be disposed about the junction region between the passage portions 9A and 9B.

Although the present invention has been described with respect to particular embodiments, it is not thereby limited but on the contrary is susceptible to modifications and variations which will be apparent to one skilled in the art. It can be applied to the PSA production of other gases such as oxygen from gaseous mixtures containing different components adsorbable by beds of adsorbent.

We claim:

1. In a process for the production of a production gas by pressure swing adsorption from a gaseous mixture containing this gas in at least one adsorber unit comprising, in series, a first bed of water-retaining adsorbent and a second bed of a gas-separating adsorbent, comprising a step of gas production in which the gaseous mixture is caused to pass successively through the first and second bed, the improvement which further comprises the steps of:

providing an intermediate gas passage portion of reduced cross section relative to the cross section of each of the beds and of reduced length relative to a flow path defined by the first and second beds, said gas passage portion establishing gas communication between the first and the second beds; and supplying a heat flow from an external source to the intermediate gas passage portion to raise its temperature.

2. Process according to claim 1, further comprising the step of placing the intermediate gas passage portion in continuous heat exchange relation with a heat source.

3. Process according to claim 2, wherein the heat source is a heated fluid.

4. Process according to claim 1, wherein the gaseous mixture is air and the production gas is oxygen.

5. Process according to claim 4, wherein the air is supplied to said at least one absorber unit at a pressure greater than $7 \times 10^5$ Pa.

6. Process according to claim 1, wherein the temperature of the intermediate gas passage portion is maintained at a value not less than 20° C.

7. An adsorber unit comprising at least one adsorption line comprising, in series, at least one first enclosure enclosing at least one first adsorbent and at least a second enclosure enclosing at least one second adsorbent, at least one intermediate fluid passage means of reduced cross section relative to the cross section of each of the adsorbents, and of reduced length relative to a flow path defined by the first and second adsorbents and having an outer surface and establishing direct fluid flow communication between the first and second enclosures, and external heater means for supplying at least temporarily a flow of heat to the outer surface of the intermediate fluid passage means.

8. The adsorber unit of claim 7, wherein the first and second enclosures and said at least one intermediate fluid passage means form a unitary assembly.

9. The adsorber unit of claim 7, wherein the first and second enclosures are superimposed.

10. The adsorber unit of claim 9, wherein the first and second enclosures are disposed in a common casing.

11. The adsorber unit of claim 10, wherein the casing is at least partially thermally insulated.

12. The adsorber unit of claim 10, comprising fluid flow passage means for causing fluid to transit through the first and second adsorbents and terminating at the bottom of the casing for connection to external fluid flow circuit means.

13. The adsorber unit of claim 7, wherein the first and second enclosures are annular and in vertically adjacent superimposed relationship.

* * * * *